United States Patent
Tollet et al.

(10) Patent No.: US 9,094,283 B2
(45) Date of Patent: Jul. 28, 2015

(54) DATA COLLECTION DEVICE FOR MONITORING STREAMS IN DATA NETWORK

(75) Inventors: Jerome Tollet, Paris (FR); Jerome Abela, Colombes (FR)

(73) Assignee: QOSMOS, Paris (FR)

( * ) Notice: Subject to any disclaimer, the term of this patent is extended or adjusted under 35 U.S.C. 154(b) by 252 days.

(21) Appl. No.: 13/805,963

(22) PCT Filed: Apr. 14, 2011

(86) PCT No.: PCT/FR2011/050867
§ 371 (c)(1),
(2), (4) Date: Dec. 20, 2012

(87) PCT Pub. No.: WO2011/161340
PCT Pub. Date: Dec. 29, 2011

(65) Prior Publication Data
US 2013/0173792 A1     Jul. 4, 2013

(30) Foreign Application Priority Data
Jun. 23, 2010 (FR) ..................... 10 55016

(51) Int. Cl.
    *G06F 15/16*     (2006.01)
    *H04L 12/26*     (2006.01)
(52) U.S. Cl.
    CPC ............... *H04L 43/00* (2013.01); *H04L 43/18* (2013.01)
(58) Field of Classification Search
    CPC ................................. H04L 43/00; H04L 43/18
    USPC ........................................... 709/224; 714/39
    See application file for complete search history.

(56) References Cited

U.S. PATENT DOCUMENTS

| 6,931,574 | B1 * | 8/2005 | Coupal et al. ................. 714/39 |
| 7,188,168 | B1 | 3/2007 | Liao |
| 7,272,646 | B2 * | 9/2007 | Cooper et al. ............... 709/223 |

(Continued)

FOREIGN PATENT DOCUMENTS

| EP | 1 722 508 | 11/2006 |
| EP | 1 722 509 | 11/2006 |

OTHER PUBLICATIONS

International Search Report dated Sep. 16, 2011 for Application No. PCT/FR2011/050867.
Dussel, P., et al. "Incorporation of Application Layer Protocol Syntax into Anomaly Detection", Information Systems Security, Springer Berlin Heidelberg, Dec. 16, 2008, pp. 188-202.

(Continued)

*Primary Examiner* — Moustafa M Meky
*Assistant Examiner* — Thorne E Waugh
(74) *Attorney, Agent, or Firm* — Frost Brown Todd (57) ABSTRACT

The invention relates to a data collection device for monitoring streams in a data network using a packet transmission mode, including an extractor for extracting data contained in packets belonging to a stream defined by a transmitter, a receiver, and a protocol. The collection device also includes a syntax analyzer which receives data in real time from the extractor and breaks the data down into elements according to the syntactic rules of the protocol, said syntactic rules enabling the elements to be represented as a tree structure. The syntax analyzer combines respective tree state indicators with at least some of the elements, wherein the tree state indicator combined with an element locates said element within the tree structure. An interface transmits the tree state indicators, together with the elements with which the latter have been combined, to a stream analyzer external to the collection device.

11 Claims, 4 Drawing Sheets

(56) References Cited

U.S. PATENT DOCUMENTS 7,522,530 B2 4/2009 Fdida et al.
2009/0327993 A1 12/2009 Chinta et al.

OTHER PUBLICATIONS

Pang, R., et al., "binpac: A yacc for Writing Application Protocol Parsers", Proceedings of the ACM SIGCOMM Internet Measurement Conference, IMC'06, Oct. 25-27, 2006, Rio de Janeiro, Brazil.

* cited by examiner

Key: brevet = patent

FIG. 5

DATA COLLECTION DEVICE FOR MONITORING STREAMS IN DATA NETWORK

The present invention relates to the technique for monitoring communication streams in data networks.

In the context of monitoring data streams in a data network such as the Internet, equipment is faced with the increasing number of protocols in use and the amount of data transferred, in addition to the multiplicity of transmitters/receivers.

There are currently two types of devices for implementing such monitoring of streams. Devices of a first type collect a set of packets during a set period of time then, in a subsequent step, analyze and process the collected packets. An example of this type of device is based on the software distributed under the trade mark Wireshark, formerly the trade mark Ethereal.

The second type of device uses hardware mechanisms to capture the data then transmit it to analysis devices. Frequently the transmission of information between the capture and the analysis devices is based on the IPFIX protocol standardized by the IETF (Internet Engineering Task Force) under the reference RFC 3917.

In "Incorporation of Application Layer Protocol Syntax into Anomaly Detection", Information Systems Security, Springer, pp. 188-202, December 2008, P. Düssel et al. describe the incorporation of an application layer protocol syntax into a process for detecting anomalies in telecommunications networks. An intrusion detection system called "Bro" captures packets on the network and reassembles TCP segments in order to transmit incoming packets to a protocol analyzer using a syntax analyzer language (yacc) called "binpac".

The Applicant has developed technologies for monitoring networks of the Internet type. It has in particular filed patent applications EP 1 722 509 A1 and EP 1 722 508 A1 describing multi-level architectures enabling complex protocol stacks to be examined in real time in order to extract from them the streams, i.e. the structured data set transmitted between a transmitter and a receiver.

In view of the quantity of information to be processed at the data collector level, the latter must be restricted to carrying out the processing that is absolutely essential for transmitting the relevant information, and only that information, to an analyzer.

Some solutions load the data collectors with processing operations allowing a transfer of structured and relevant information. However, these solutions require the development of high-performance hardware architectures, taking account of the amount of information to be inspected in real time by the data collector.

Other types of solutions limit the processing carried out by the data collectors, by making them transfer unstructured data, including redundant and/or unnecessary data, which leads to other constraints at the level of the analyzer and its interface with the data collector.

Another possibility consists of carrying out deferred processing at the level of the analyzer. Nevertheless this results in a reduced reactivity of the application that performs the monitoring of streams.

It would therefore be advantageous to propose a data collection technique which makes it possible to transfer to the analyzer only structured and relevant data while limiting the hardware resources required for processing the capture and editing of these data.

According to the invention, a data collection device is proposed for monitoring streams in a data network using a packet transmission mode.

This device comprises:
- an extractor of data contained in packets belonging to a stream defined by a transmitter, a receiver and a protocol;
- a syntax analyzer arranged for:
  - receiving the data from the extractor in real time;
  - breaking down the data received into elements according to syntactic rules of said protocol, the syntactic rules making it possible to represent said elements as a tree structure; and
  - associating respective tree state indicators with at least some of said elements, where the tree state indicator associated with an element labels said element in the tree structure; and
- an interface for transmitting the tree state indicators to a stream analyzer, together with the elements with which they have been associated.

In an embodiment of the device, the tree state indicator associated with an element comprises an identifier of a parent node of the tree structure to which is attached a site receiving said element in the tree structure representation. The syntax analyzer can be arranged for:
- allocating a node identifier to a current element if it is determined according to the syntactic rules that the current element is received, in the tree structure representation, at a site situated at a node of the tree structure; and
- including the node identifier allocated to the current element in the tree state indicator associated with said current element.

In an advantageous embodiment, the syntax analyzer is arranged so as to contain in memory, for a given stream after transmission of an element and its associated tree state indicator, only each node identifier encountered when moving up the tree structure from the site receiving said element in the tree structure representation.

Another aspect of the invention relates to a system for monitoring streams in a data network using a packet transmission mode. This system comprises a data collection device such as defined above and a stream analyzer receiving the transmitted elements with the associated tree state indicators.

Yet another aspect of the invention relates to a method for monitoring streams in a data network using a packet transmission mode. The method comprises:
- extracting data contained in packets belonging to a stream defined by a transmitter, a receiver and a protocol;
- breaking down the data received into elements in real time, according to syntactic rules of said protocol, the syntactic rules making it possible to represent said elements according to a tree structure;
- associating respective tree state indicators with at least some of said elements, where the tree state indicator associated with an element labels said element in the tree structure; and
- transmitting the tree state indicators to a stream analyzer, together with the elements with which they have been associated.

The method can comprise moreover the construction of at least a part of the tree structure, at the stream analyzer level, from the transmitted elements with the associated tree state indicators.

Other features and advantages of the present invention will become apparent in the following description of a non-limitative embodiment, with reference to the attached drawings, in which.

Figure 1:
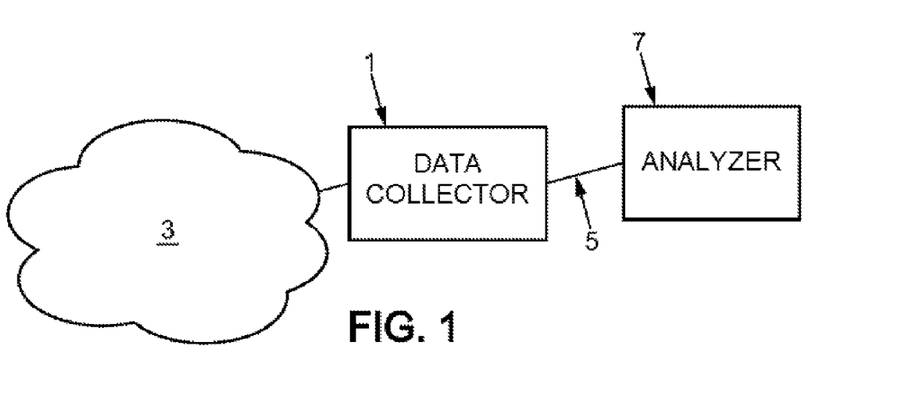
FIG. 1 is a diagrammatic view of a monitoring system in a data network according to an embodiment of the invention

With reference to FIG. 1, a monitoring system contains a data collector 1 connected directly onto a data network 3, for example the Internet, using an IP ("Internet Protocol") packet type protocol to capture the packets flowing over this network. This data collector 1 uses for example the architecture detailed in Patent Application EP 1 722 509 A1 or Patent Application EP 1 722 508 A1. It sends structured data extracted from the packets flowing over the data network 3 via a data connection 5 to an analyzer 7.

The transmissions on the data network 3 conventionally use a transmission protocol stack. Thus, for example, in the context of website search, an IP packet contains a TCP ("Transmission Control Protocol") protocol data structure, itself containing an HTTP ("Hypertext Transfer Protocol") data structure. In the context of email, the TCP data structure contains an SMTP ("Simple Mail Transfer Protocol") data structure, etc. According to the type of stream in question, many other application layer or transport layer protocols are used, as is well known in the field of IP network communications.

The information flowing in the context of a given stream is rarely contained in a single IP packet. On the contrary, this information is segmented in order to be sent in several successive packets. These IP packets flow across the network, the packet header containing routing information, in particular the IP addresses of the source and destination of the packet. Other packets belonging to other streams may be intercalated between them. The packets can follow different routes within the network, and/or be received in a different order from that in which they were transmitted.

In order to monitor a given stream, it is convenient to identify packets belonging to the stream in question, to extract from them the relevant information, and analyze it according to the requirements of the monitoring application in question. In the architecture in FIG. 1, the identification and the extraction are provided by the data collector 1 while the monitoring application itself is executed by the analyzer 7.

Figure 2:
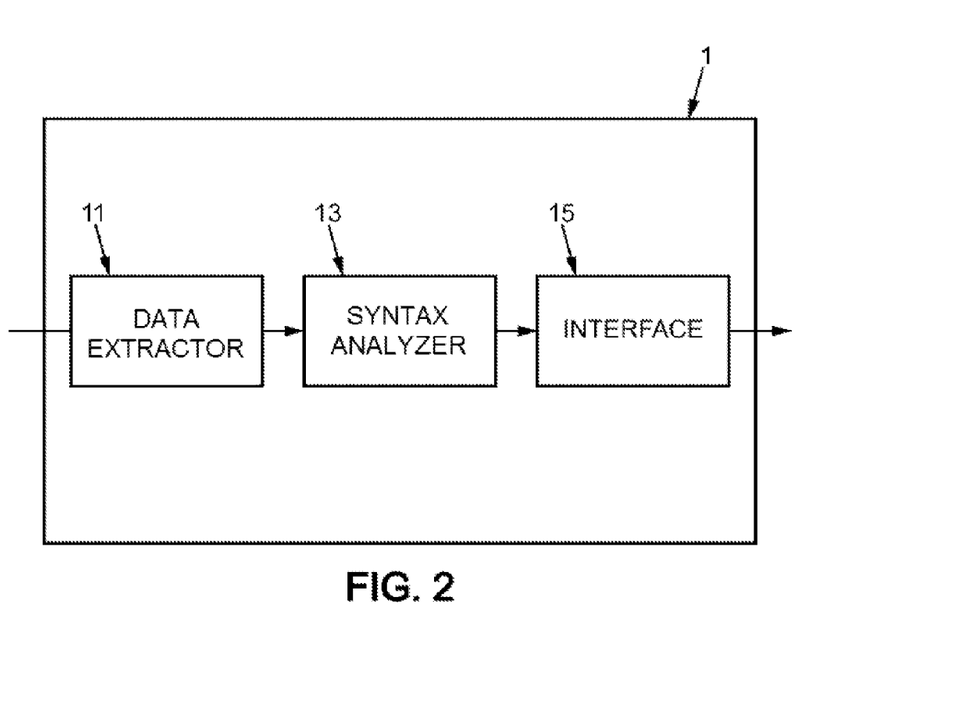
FIG. 2 is a functional diagram of a data collector device of the monitoring system in FIG. 1.

With reference to FIG. 2, the data collector 1 contains a data extractor 11 connected to a node or a link of the network 3 in order to observe the traffic. The data extractor 11 has a network interface suited to the low protocol layers used by the network 3 at the node or link level where the extractor is connected. It extracts the data contained in the packets belonging to a specified stream, the stream being defined by a sender, a receiver and a protocol (for example, SMTP for email, HTTP for web browsing, etc.).

The data collector 1 moreover contains a syntax analyzer 13 which receives in real time data extracted by the extractor 11 for a given stream. The syntax analyzer 13 has software resources incorporating syntactic rules for the relevant protocol for the stream in question. It breaks down the data extracted from the stream into elements, also called events, respecting the protocol syntax of the stream. The elements thus obtained are provided to an interface 15 which is responsible for transmitting them to the external analyzer 7 with tree state indicators.

Breakdown of the stream data into elements is carried out by the syntax analyzer 13 according to syntactic rules applicable to the protocol, which make it possible to represent these elements according to a tree structure. In practice, the tree structure is not stored in a complete fashion at the level of the data collector 1. It is reconstituted by the structured data analyzer 7 if required by the application. The data collector 1 merely stores the tree states, the indicators of which are respectively associated with the elements resulting from the breakdown carried out by the syntax analyzer 13.

The tree state indicator associated with an element labels this element in the tree structure so that the structured data analyzer 7 is able to locate it in the monitored stream.

By tree is meant a data structure within the meaning of graph theory comprising a root data item and child data such that a child data item is only linked to a single higher-level parent data item. A data item having links to child data items is called a tree node and a data item with no child data item is called a leaf of the tree. A tree is therefore a graph with no loop.

Figure 3:
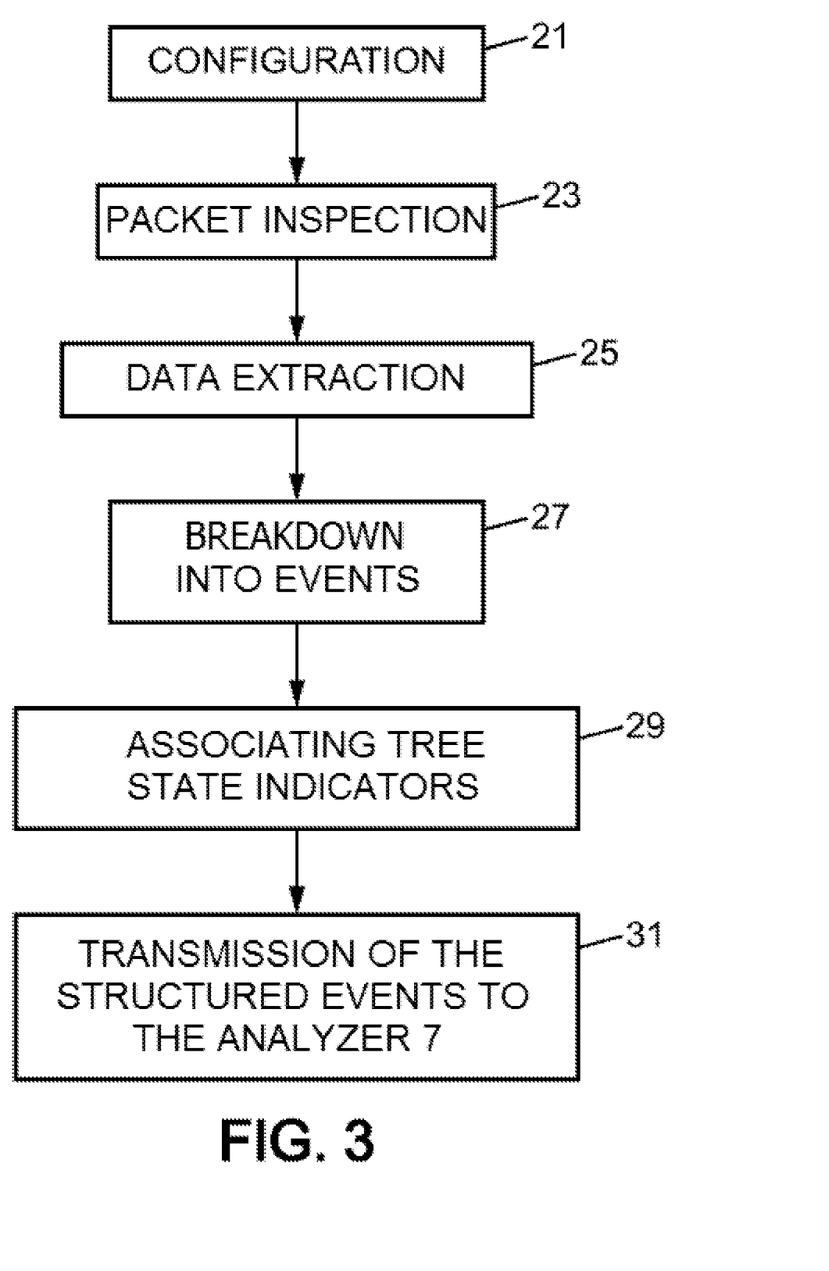
FIG. 3 is a flow chart of the operation of the collector device in FIG. 2.

The general operation of the data collector 1 is illustrated by the diagram in FIG. 3. In a configuration step 21, the parameters required by the extractor 11 are provided to it, in particular:

the relevant transmitter, receiver and protocol for a monitored stream;

an indication of data types to be extracted (all the data, certain messages only, data conforming to this or that configurable condition, etc.). In a simple configuration, all the data of the stream are extracted, any filtering being carried out at the level of the analyzer 7. Specifying that certain types of data only are to be extracted makes it possible, optionally, to reduce the load on the collector 1 and the quantity of information to be transferred over the connection 5;

identifying an instance of the syntax analyzer 13 handling the stream in question, since in practice, the extractor 11 and the analyzer 13 can examine several streams at once.

In step 23, the extractor 11 inspects the packets as they are transmitted over the network 3. To this end, it uses for example the recognition and protocol analysis method described in Patent Application WO 2004/017595 A2. It is thus capable of extracting, in step 25, the data belonging to the protocol specified during the configuration and flowing from the specified transmitter to the specified receiver, and transmitting these data in real time to the syntax analyzer 13.

In order to illustrate the functions of the syntax analyzer 13 in the breakdown step 27 shown in FIG. 3, the particular case is considered of an HTTP protocol-compliant stream between a given transmitter and receiver. In this illustrative example, the extractor 11 analyzes the packets and extracts from two successive packets, after deletion of the headers, the information shown in Table I.

TABLE I

| Packet number | HTTP content of the packet |
| --- | --- |
| P1 | GET /search?hl=fr& |
| P2 | q=brevet HTTP/1.0\nHost: google.fr\n |

In this particular case, the complete HTTP request: GET/search?hl=fr&q=brevet HTTP/1.0\nHost: google.fr\n was segmented into two packets so that it can be transported while respecting the limits imposed by the protocols of the lower levels (TCP, IP, layers 1 and 2) in terms of payload size.

Semantically, this HTTP message is broken down into a "GET" request command and a URI ("Uniform Resource Identifier"). The URI itself is broken down into syntactically relevant elements or events. These elements are arranged in the data placed in the packets according to the syntactic rules appropriate to the protocol in question (here HTTP).

For example, the data from packet P1 can be broken down as shown in Table II,

TABLE II

| Event number | content |
|---|---|
| 1.1 | request |
| 1.2 | uri=/search?hl=fr& |
| 1.3 | uri_param |
| 1.4 | name = hl |
| 1.5 | value = fr | while the data from packet P2 can be broken down as shown in Table III.

TABLE III

| Event number | content |
|---|---|
| 2.1 | uri = q=brevet |
| 2.2 | uri_param |
| 2.3 | name = q |
| 2.4 | value = brevet |
| 2.5 | server = google.fr |

Event 1.1 corresponds to the detection of the "GET" command. Then, the syntax analyzer 13 determines that the remainder of the packet P1 forms part of the URI resource identifier, which constitutes the next event 1.2. This event "uri=/search?hl=fr&" must itself be broken down into events as it reveals a list of parameters which may be incomplete. This fresh breakdown means descending one level in the tree structure to add event 1.3 which declares a URI parameter. Then, events 1.4 and 1.5 give the name and value of this first parameter. On receiving packet P2, it is apparent that the URI (event 2.1) is followed by another parameter (2.2) the name and value of which are given by events 2.3 and 2.4. Finally, after the version number of the HTTP protocol, which can be ignored in this example, the last event relates to the server queried, here "google.fr".

The syntax analyzer 13 carries out a breakdown of this type in step 27 according to the syntax of the analyzed protocol, in order to convert the raw data provided by the extractor 11 into events. Each application protocol (SMTP, SIP, RTP, etc.) uses its own syntax, generally different from that of the HTTP protocol given in the example. The syntax analyzer can have a modular architecture allowing it to analyze different protocols on different streams. Thus a new protocol can be analyzed by the syntax analyzer by developing a specific module for its syntax.

It is desirable to transmit sufficient data to the external analyzer 7 to allow it to reconstitute the stream, in particular according to the tree structure, but with the minimum of additional information. If the data collector 1 transmits only the contents of events shown in the right-hand columns of Tables II and III, ambiguities will remain. For example, the analyzer 7 cannot know whether event 1.2, 2.1 or 2.5 relates to the same request as event 1.1. In order to avoid these ambiguities without the need to transmit information originating from lower protocol layers (such as for example sequence numbers of TCP segments), the event contents are transmitted by the data collector in step 31 in a structured form with the tree state indicators associated by the syntax analyzer 13 in step 29.

Figure 4:
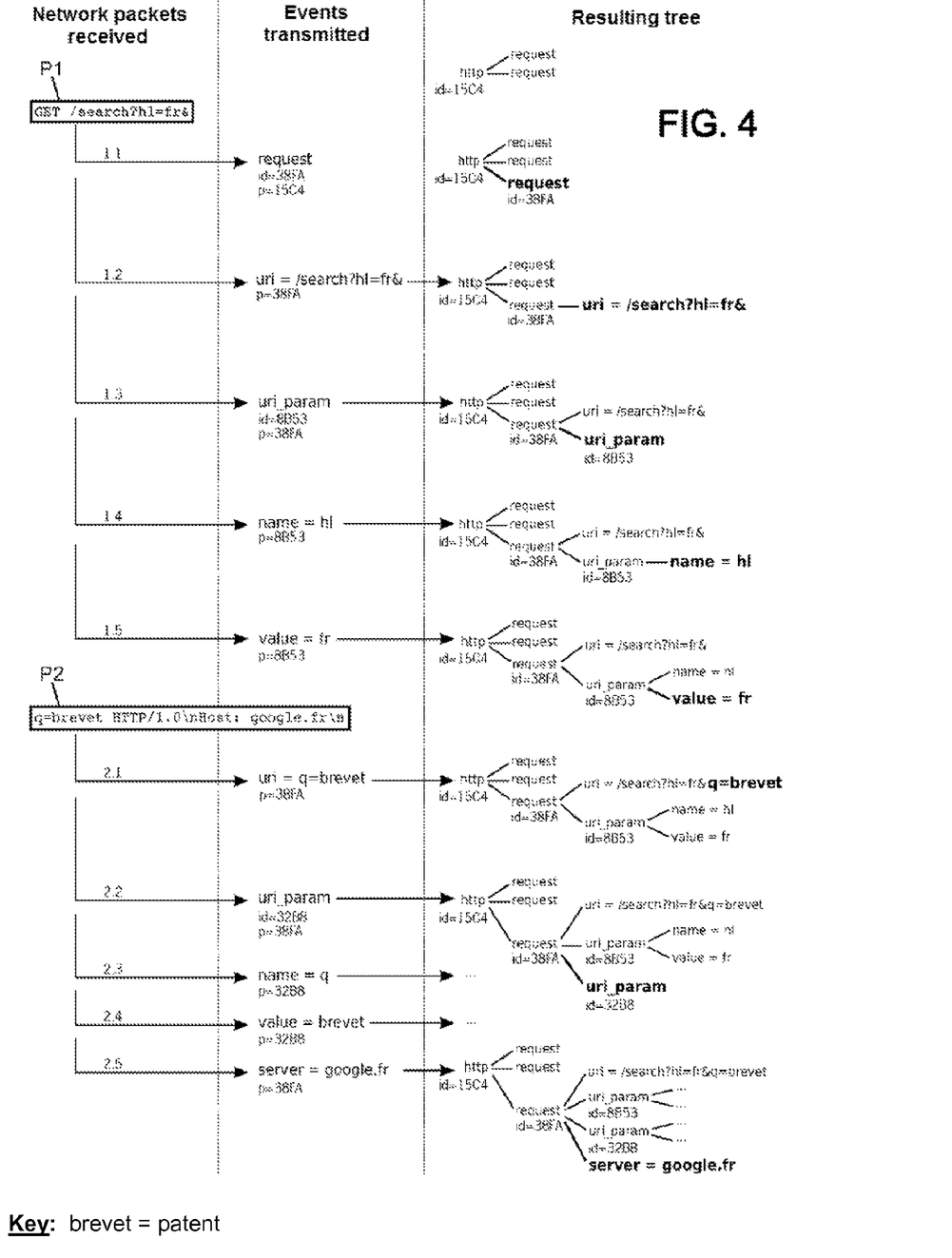
FIG. 4 is an illustrative example of breaking down an HTTP request into a dynamic tree according to a embodiment of the invention.

The tree states can be determined in the manner illustrated in FIG. 4 in the example already discussed above. In FIG. 4, the left-hand column shows the breakdown of packets P1, P2 extracted from the stream into elements or events such as those summarized in Tables II and III. The central column in FIG. 4 shows the events as transmitted by the data collector 1 to the external analyzer 7 in step 31, together with their respective tree state indicators, and the right-hand column shows the manner in which the analyzer 7 is capable of reconstituting the tree representing the monitored stream. In this right-hand part, the bold characters denote the elements that the analyzer 7 adds to the tree as they are received from the collector 1.

The tree can be constructed by the analyzer 7 as the events are received, starting from a root node corresponding to the analyzed stream. The root node is denoted by "http" in FIG. 4 and bears for example a node identifier (id) 15C4. In this example, the tree already has two received requests before the one carried by packets P1 and P2, denoted at the top of the right-hand column by the two "request" nodes, the branches of which are not shown in order to avoid overloading the drawing.

On receiving event 1.1 indicating a fresh request for the stream in question, a new "request" node is added to the tree, having the root "http" as its parent node. As this is an event for which, following the HTTP protocol rules, the syntax analyzer 13 knows that there will be child data, it allocates a node identifier thereto, in this example id=38FA. The tree state indicator associated with event 1.1 by the syntax analyzer 13 in step 29 contains in this case the node identifier 38FA that it has just allocated thereto and the identifier (p) of its parent node in the tree, here p=15C4.

On receiving event 1.1 with the indicator (id=38FA/ p=15C4), the analyzer 7 will be able to add the new node to the tree, storing therefrom the identifier 38FA in relation to its position (child of the root node 15C4).

In the next event (2.2) resulting from the breakdown step 27 a tree state indicator is also allocated in step 29, containing the identifier of its parent node in the tree, in this case p=38FA. As the syntax analyzer 13 is able to determine that this event corresponds to a leaf of the tree, it has no need to allocate a node identifier thereto and its tree state indicator can therefore be restricted to the identifier p=38FA of its parent node denoting the current HTTP request.

The third event 1.3 declares that the following contains parameters of the URI. It can therefore be represented as a child node of the "request" node (38FA) which will have links with other child nodes. As a consequence, the syntax analyzer 13 allocates a unique identifier thereto, for example id=8B53, so that its associated tree state indicator is (id=8B53/ p=38FA).

The next events (1.4, 1.5) which give the name and value of the URI parameters are attached in the form of leaves to the node 8B53. Their tree state indicators are simply p=8B53, without specifying any new node identifier.

For events 2.1-2.5 extracted from packet P2, the logic of construction of the tree by the analyzer 7, shown in the bottom part of FIG. 4, is similar to that which has just been described. The syntax analyzer 13 of the collector 1 therefore allocates new identifiers on the fly to the nodes that appear (without the need to do so for the tree leaves), and it associates with each event transmitted a tree state indicator containing the unique identifier of its parent node and, if it is itself represented by a node having descendents, the identifier freshly allocated to this node.

It should be noted that the URI, which in the example was truncated in packet P1 following packet segmentation, has been completed after event 2.1 has been received by the analyzer 7. The latter can in fact note according to the previous leaf "uri=/search?hl=fr&" that the URI is truncated so that on receiving a fresh event of the type URI (2.1), it will proceed by concatenation onto the corresponding leaf rather than by creating a new leaf. This processing by the analyzer 7 does not require any special signaling by the data collector 1.

The entire processing for the construction of the tree using tree state indicators is shown in FIG. 4. The HTTP request analyzed can be represented in the form of a tree as shown at the bottom and on the right of FIG. 4.

This transmission advantageously makes it possible to transmit only the required items of information while retaining the structuring, or the context, of the data transmitted using the node identifiers. It is carried out as the packets are received by the collector 1 and allows the analyzer 7 to reconstitute the monitored streams, immediately if required.

Another advantage is that the data collector 1, which is subject to the most demanding processing speed requirements, needs to store in memory only the minimum dynamic information corresponding to the identifiers of the nodes that are found in the tree when returning to the root from the current event. The syntactic rules of the protocol in question, by examining the continuation of the stream, allow attachment to the appropriate node. The items of information relating to the "brother" or "cousin" nodes of the current event in the tree do not need to be stored by the collector 1.

It should be noted that the methods and devices according to the invention are in no way limited to the HTTP protocol, which has been mentioned only in order to illustrate an embodiment in concrete terms.

To give another example, an email application protocol such as SMTP can be considered. A stream of this protocol between a sender and a receiver gives rise to successive messages (email in the tree illustration in FIG. 5) each having a subject (subject), a sender (sender) having an email address (sender_email) and an optional alias (sender_alias), one or more receivers (receiver) each having an email address (receiver_email) and an optional alias (receiver_alias), a message body (message) and optionally, other fields (indicating urgency, confidentiality, attachment(s), etc.). It is possible for the syntax analyzer 1 to label these different fields if it is provided with the appropriate syntactic rules of the protocol used. They are often sent in different IP packets, according to the segmentation used at sender level.

Figure 5:
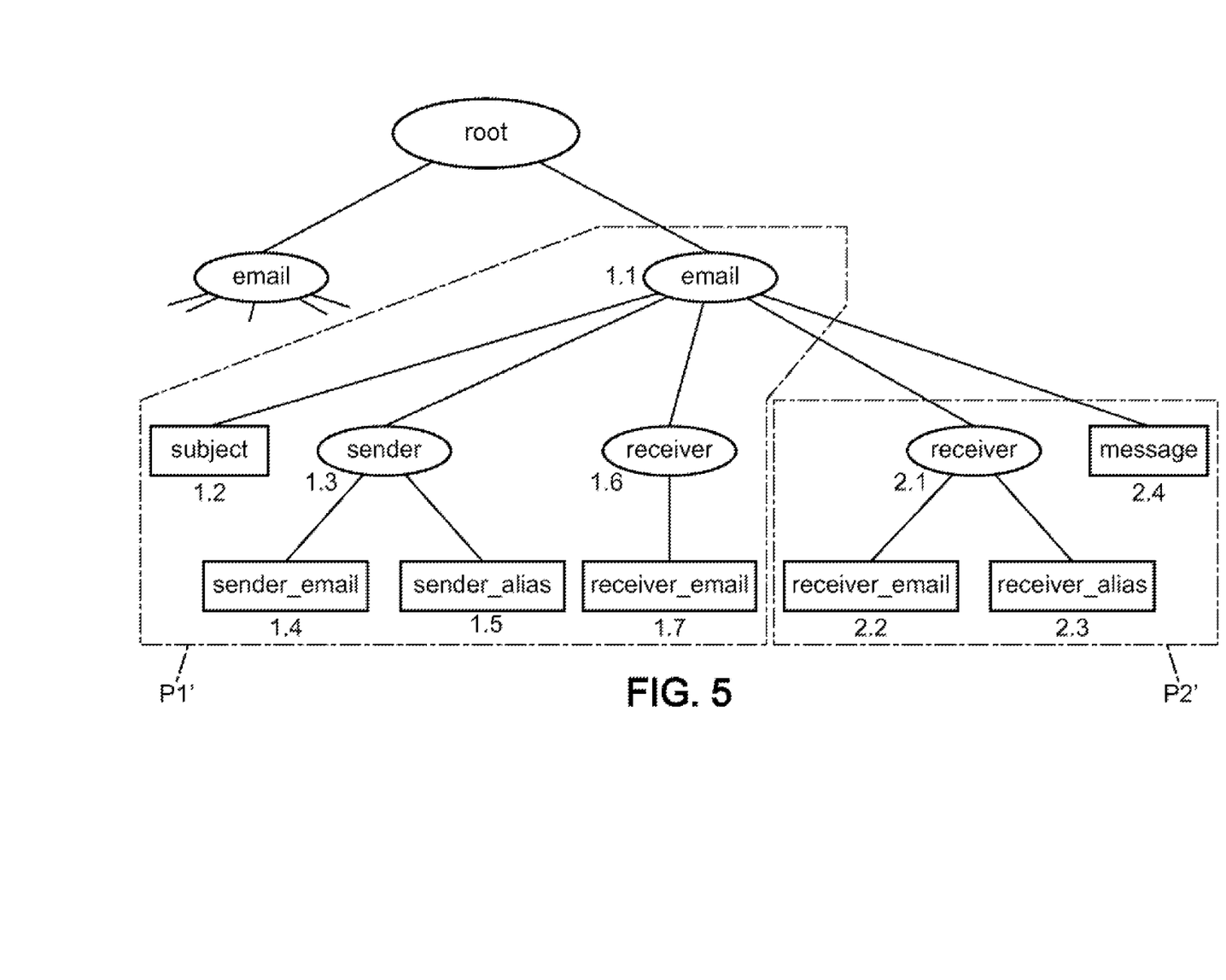
FIG. 5 shows an example tree structure in the case of an email protocol.

FIG. 5 details the branches of the tree that can be constructed by the structured data analyzer 7 to represent a simple message example having two receivers. It is assumed that the elements framed with broken lines are extracted from a first packet P1' and that those framed with dash-dotted lines are extracted from a second packet P2' (which can be followed by one or more further packets containing a continuation of the body of the message, attachments, etc.).

In this example, the breakdown step 27 gives rise to seven events 1.1-1.7 for the first packet P1' and four events 2.1-2.4 for the second packet P2'. In step 29, the syntax analyzer 13 allocates identifiers to the successively detected nodes (represented by ellipses in FIG. 5) and attaches these nodes as well as the leaves (represented by rectangles) to respective parent nodes. These identifiers and these attachments are transmitted as tree state indicators to the external analyzer 7 which will reconstitute all or part of the tree shown in FIG. 5 if the application so requires.

It is noted that after processing the first packet P1' which ends with the address of a receiver (event 1.7), the syntax analyzer 13 of the data collector 1 needs to store in memory only the identifier of the parent node (1.6) of this event, in case a subsequent packet may contain a pseudonym of the receiver in question, the identifier of the grandfather node (1.1), in case the next packet of the stream may begin with the body of the message, the date, an attachment or other, and the identification of the root node, in case a new message may appear in the stream.

The above method of representing as a tree structure the data transmitted in a stream and transmitting a minimum structural description of the elements that can be placed in the tree is applicable to any type of protocol on the basis of a description of the relevant syntactic rules for the protocol in question.

The invention has been illustrated and described in detail in the drawings and the preceding description. The latter must be considered as illustrative and given by way of example and non-limitative of the scope of the invention to this description alone. Numerous embodiment variants are possible.

The invention claimed is:

1. Data collection device for monitoring streams in a data network using a packet transmission mode, the device comprising:
   an extractor of data contained in packets belonging to a stream defined by a transmitter, a receiver and a protocol;
   a syntax analyzer arranged for:
      receiving the data from the extractor in real time;
      breaking down the data received into elements according to syntactic rules of said protocol, the syntactic rules making it possible to represent said elements as a tree structure; and
      associating respective tree state indicators with at least some of said elements, where the tree state indicator associated with an element labels said element in the tree structure; and
   an interface for transmitting the tree state indicators to a stream analyzer, together with elements with which they have been associated.

2. Device according to claim 1, wherein the tree state indicator associated with an element contains an identifier of a parent node of the tree structure to which is attached a site receiving said element in the tree structure representation.

3. Device according to claim 2, wherein the syntax analyzer is moreover arranged for:
   allocating a node identifier to a current element if it is determined according to the syntactic rules that the current element is received, in the tree structure representation, at a site situated at a node of the tree structure; and
   including the node identifier allocated to the current element in the tree state indicator associated with said current element.

4. Device according to claim 3, wherein the syntax analyzer is arranged so that it only stores in memory, for a given stream, after transmission of an element and its associated tree state indicator, each node identifier encountered when moving up the tree structure from the site receiving said element in the tree structure representation.

5. System for monitoring streams in a data network using a packet transmission mode, the system comprising a data collection device according to claim 1 and a stream analyzer receiving the transmitted elements with the associated tree state indicators.

6. System according to claim 5, wherein the stream analyzer is arranged to construct at least a part of the tree structure from the transmitted elements with the associated tree state indicators.

7. Method for monitoring streams in a data network using a packet transmission mode, the method comprising:
- extracting data contained in packets belonging to a stream defined by a transmitter, a receiver and a protocol;
- breaking down the data received into elements in real time, according to syntactic rules of said protocol, the syntactic rules making it possible to represent said elements according to a tree structure;
- associating respective tree state indicators with at least some of said elements, where the tree state indicator associated with an element labels said element in the tree structure; and
- transmitting the tree state indicators to a stream analyzer (7), together with the elements with which they have been associated.

8. Method according to claim 7, wherein the tree state indicator associated with an element comprises an identifier of a parent node of the tree structure to which is attached a site receiving said element in the tree structure representation.

9. Method according to claim 8, further comprising:
- allocating a node identifier to a current element if it is determined according to the syntactic rules that the current element is received, in the tree structure representation, at a site situated at a node of the tree structure; and
- including the node identifier allocated to the current element in the tree state indicator associated with said current element.

10. Method according to claim 9, wherein, for a given stream after transmission of an element and its associated tree state indicator, no more is retained than each node identifier encountered when moving up the tree structure from the site receiving said element in the tree structure representation.

11. Method according to claim 7, further comprising the construction of at least a part of the tree structure, at the stream analyzer level, from the transmitted elements with the associated tree state indicators.

* * * * *